UNITED STATES PATENT OFFICE.

HERMANN GUSSMANN, OF HÖCHST-ON-THE-MAIN, GERMANY, ASSIGNOR TO THE FARBWERKE, VORM. MEISTER, LUCIUS & BRÜNING, OF SAME PLACE.

BLACK SULFUR DYE.

SPECIFICATION forming part of Letters Patent No. 671,908, dated April 9, 1901.

Application filed October 7, 1899. Serial No. 732,914. (No specimens.)

*To all whom it may concern:*

Be it known that I, HERMANN GUSSMANN, Ph. D., a citizen of the Empire of Germany, residing at Höchst-on-the-Main, Germany, have invented certain new and useful Improvements in the Manufacture of a Sulfurized Black Dyestuff, of which the following is a specification.

I have found that by heating the condensation product of paranitrochlorbenzenesulfonic acid and para-amidocresol

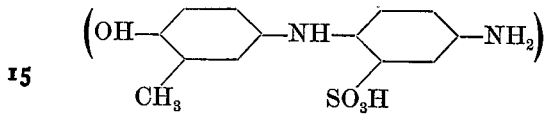

with sulfur and a sulfid of an alkali metal a valuable black dyestuff may be obtained.

*Manufacture of the condensation product of para-oxy-meta-methyl-para-nitrodiphenylamin-ortho-sulfonic acid or para-oxy-meta-methyl-para-amido-diphenylamin-ortho-sulfonic acid.*—One molecular proportion of sodium nitro-chlorbenzene sulfonate,

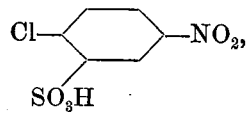

is heated with one molecular proportion of para-amidocresol,

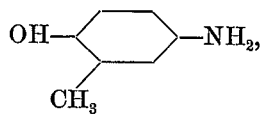

one molecular proportion of sodium acetate and four liters of water in a closed vessel for six hours to 120° centigrade. A red-brown solution is obtained from which the nitro compound is precipitated by common salt in the form of reddish-brown crystalline needles. To obtain the amido compound, the solution is at once further operated on—that is to say, it is reduced with iron and acetic acid. After reduction the iron is precipitated with sodium carbonate and the liquid is filtered and again acidified, when the amido compound is separated in the form of white needles. It is soluble with difficulty in water.

*Manufacture of the dyestuff.*—One part, by weight, of para-oxy-meta-methyl-para-amido-diphenylamin-ortho-sulfonic acid is introduced into a molten mixture of one part, by weight, of sulfur and three parts, by weight, of sodium sulfid, and the whole is heated for one to two hours to 180° centigrade and afterward for three to four hours to 240° centigrade. An active evolution of hydrogen sulfid takes place.

The product is a dark porous mass. Its aqueous solutions may be directly employed for dyeing. They dye unmordanted cotton in deep black tints. The color of a freshly-prepared solution is greenish brown, becoming reddish-green blue when exposed to the air. Products which are too-shortly heated are also soluble in water, with a greenish-brown color, becoming a blackish-violet color when exposed to the air.

Having now described my invention, what I claim is—

1. The herein-described process of manufacturing a black sulfurized dyestuff, which consists in heating para-oxy-meta-methyl-para-amidodiphenylamin-ortho-sulfonic acid with sulfur and sulfids of alkali metals at a high temperature, substantially as set forth.

2. As a new product, the black sulfurized dyestuff obtained as herein described, its aqueous solutions directly dyeing unmordanted cotton in deep black shades, the color of a freshly-prepared solution being greenish brown and becoming reddish-green blue when exposed to the air, the products when too-shortly heated being also soluble in water with a greenish-brown color which becomes blackish violet when exposed to the air, substantially as set forth.

In testimony that I claim the foregoing as my invention I have signed my name in presence of two subscribing witnesses.

HERMANN GUSSMANN.

Witnesses:
HEINRICH HAHN,
ALFRED BRISBOIS.